United States Patent
Takai et al.

(10) Patent No.: US 6,405,235 B1
(45) Date of Patent: Jun. 11, 2002

(54) DATA RECEIVING DEVICE CAPABLE OF EXECUTING SIMULTANEOUS RECEPTION OPERATION

(75) Inventors: Kazuhito Takai; Takuro Yamamoto, both of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/205,856

(22) Filed: Dec. 4, 1998

(51) Int. Cl.⁷ .......................... G06F 12/00; G06F 12/14
(52) U.S. Cl. .................. 709/200; 709/212; 709/229; 710/100
(58) Field of Search ................ 395/500.45; 709/212, 709/229, 200; 710/56, 100

(56) References Cited

U.S. PATENT DOCUMENTS

| | | | |
|---|---|---|---|
| 5,627,968 A | * 5/1997 | Ozaki et al. | 709/212 |
| 5,644,754 A | * 7/1997 | Weber et al. | 395/500.45 |
| 5,696,910 A | * 12/1997 | Pawlowski | 710/100 |
| 5,797,043 A | * 8/1998 | Lewis et al. | 710/56 |
| 5,829,054 A | * 10/1998 | Ehlig et al. | 711/202 |
| 6,085,248 A | * 7/2000 | Sambamurthy et al. | 709/229 |

FOREIGN PATENT DOCUMENTS

| | | |
|---|---|---|
| JP | 51-11504 | 1/1976 |
| JP | 63-215238 | 9/1988 |
| JP | 64-32759 | 2/1989 |
| JP | 3-187628 | 8/1991 |
| JP | 3-245636 | 11/1991 |
| JP | 5-324545 | 12/1993 |
| JP | 6-164595 | 6/1994 |
| JP | 7-74745 | 3/1995 |

OTHER PUBLICATIONS

Japanese Office Action issued May 10, 2000 in a related application.
"Snoop Mechanism To Monitor Computer Bus" IBM Technical Disclosure Bulletin., vol. 32, No. 11, Apr. 1990, p. 170.

* cited by examiner

Primary Examiner—Ayaz Sheikh
Assistant Examiner—Frantz B. Jean
(74) Attorney, Agent, or Firm—Ostrolenk, Faber, Gerb & Soffen, LLP

(57) ABSTRACT

In a system operable in response to a data stream sent to a first receiving device in one-to-one communication via a system bus, the data stream is also simultaneously delivered to a second receiving device via the system bus in parallel. The second receiving device can be implemented by the use of a simple circuit and can quickly process or display the data stream.

2 Claims, 4 Drawing Sheets

DATA RECEIVING DEVICE CAPABLE OF EXECUTING SIMULTANEOUS RECEPTION OPERATION

BACKGROUND OF THE INVENTION

1. Field of the Invention

This invention relates to an information processing system which transmits data between devices thereof in one-to-one communication via a system bus and, in particular, to a simultaneous receiving unit in a data receiving device included in the information system.

2. Description of the Related Art

In an information system, such as a computer system or network, which can display video data streams on a monitor or a display device, the data streams are at first transmitted from a video source device via a system bus and stored in a system memory in the system, when the data streams are displayed on the monitor. Such a process of storing the data streams into the system memory is generally referred to as "capture".

Next, the stored data streams are sent to a graphic accelerator from the system memory via the system bus. The process is generally referred to as "playback". Then, the graphic accelerator sends the data stream to the monitor using a frame buffer, and the data streams are displayed on the monitor as a dynamic or moving image.

Therefore, the data streams are transmitted in the system through the system bus twice and CPU power is consumed at each transmission. This may result not only in a reduction of a data transmission rate as a whole but also in an increase of a load.

Practically, similar problems also take place during network communication. For example, let the same messages be sent to different destinations through the network. In this case, a bandwidth of the network is repeatedly used a plurality of times which are equal to the number of the destinations. In addition, CPU power is wasted at every transmission of the message.

In a communication network, a broadcast communication method is adopted to solve the problems and makes it possible to use the bandwidth of the network only once and to thereby reduce a load of the CPU.

The broadcast communication methods are disclosed in Japanese Laid-Open Publication Nos. H5-324545 (namely, 324545/1993) and S64-62759 (namely, 62759/1989). The methods disclosed in the publications realize broadcast communication by giving group addresses to receiving device groups each of which includes a plurality of data receiving devices and by designating the group addresses at the beginning of data communication.

The broadcast communication methods are also disclosed in Japanese Laid-Open Publication Nos. S63-215238 (namely, 215238/1988) and H3-187628 (namely, 187628/1991), H3-245636 (namely, 245636/1991), and H7-074745 (namely, 074745/1995). Among these publications, S63-215238 discloses the method in which a plurality of receiving devices receive, through a network, a packet having an address, the receiving devices determine an address of the packet. In this event, data in the packet are received and fetched only by the receiving device which has the address matched with the address of the packet. However, no consideration is made at all about application of such broadcast communication methods to a display of video images.

SUMMARY OF THE INVENTION

Therefore, it is an object of the invention to provide a system which can avoid a waste of resources in a network and which can also save power consumption.

It is another object of the invention to provide a system which can realize power consumption by parallel reception of video data signals.

According to an embodiment of the invention, a system in which data communication is performed between devices via a bus comprising a data sending device which sends data via the bus in one-to-one data communication, a first data receiving device which receives the data from the data sending device via the bus, and at least one second data receiving device which receives the data sent from the data sending device to the first data receiving device, simultaneously with the receiving by the first receiving device.

DESCRIPTION OF THE PREFERRED EMBODIMENT

Figure 1:
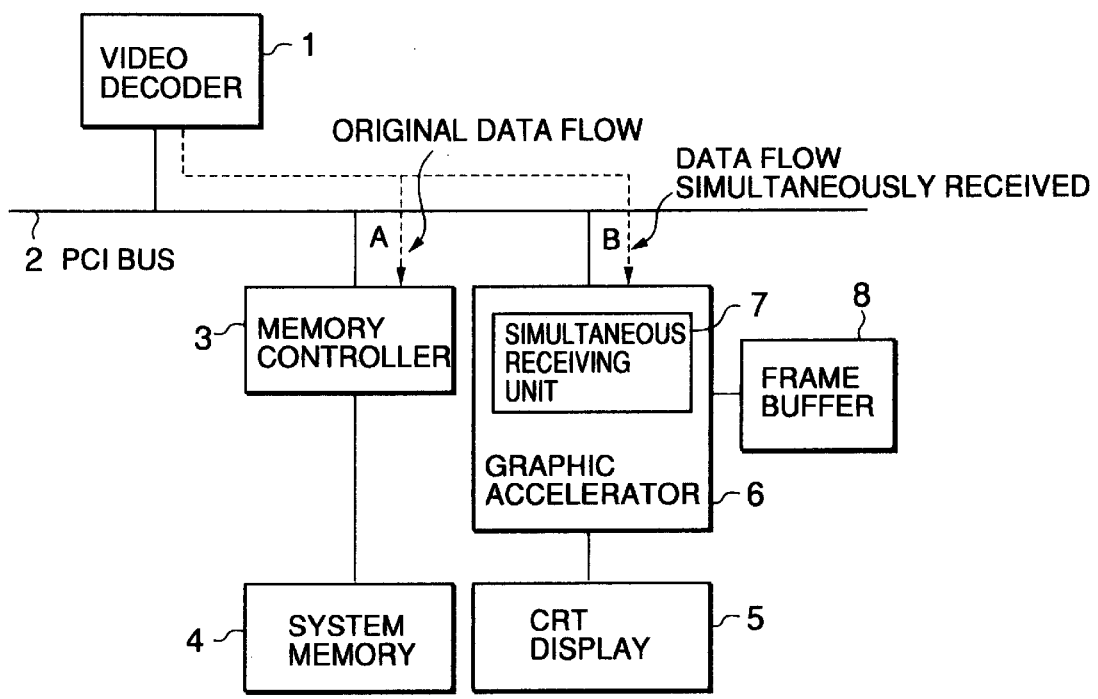
FIG. 1 shows a block diagram of a data receiving device according to a first embodiment of the invention.

FIG. 1 shows a block diagram of an information processing system according to a first embodiment of the present invention which includes a data receiving device which realizes simultaneous receiving function. This information processing system may be practically considered as a personal computer system. The system comprises a PCI bus 2 for transmitting video data from a video decoder 1 which perform analog-digital conversion of an NTSC signal.

The system further comprises a system memory 4 connected to the PCI bus 2 via a memory controller 3. Also, the system comprises a CRT display 5 and a frame buffer 8 which are connected to the PCI bus 2 via a graphic accelerator 6. The graphic accelerator 6 includes a simultaneous receiving unit 7 which will be described later in more detail. The memory controller 3 functions to control data flow to/from the system memory 4. The frame buffer 8 serves to temporarily store the video data and to cooperate with the graphic accelerator 6 to display the video data onto the CRT display 5.

In FIG. 1, it is to be noted that the video data stream is divided into two flows one of which is an original data flow A stored into the memory controller 3 from the video decoder 1 and the other of which is a data flow B simultaneous received by the graphic accelerator 6. The two flows are composed of the same data stream.

Figure 2:
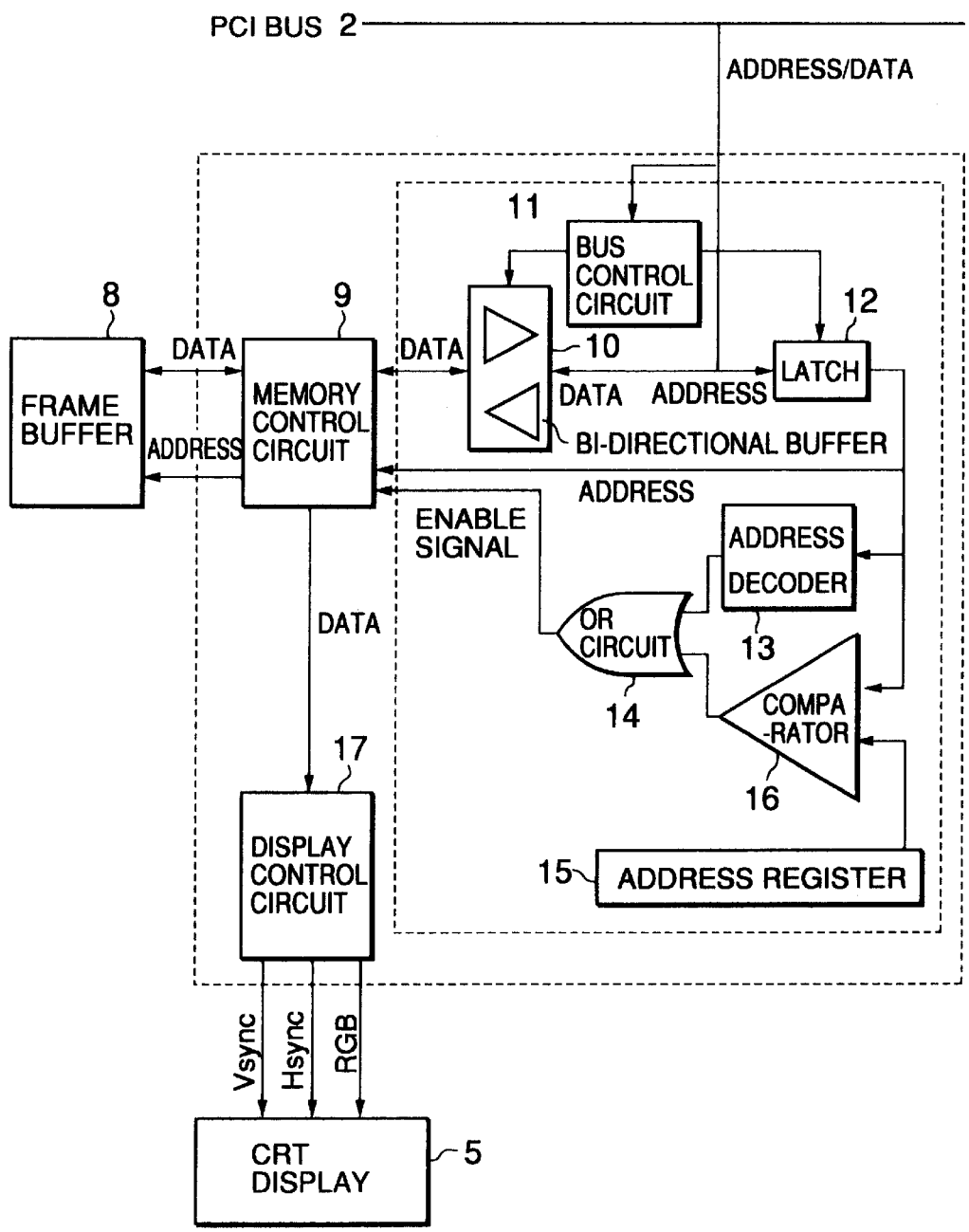
FIG. 2 shows a block diagram of a main part of the data receiving device shown in FIG. 1.

Referring to FIG. 2 together with FIG. 1, the graphic accelerator 6 will be described more in detail hereinafter. The illustrated simultaneous receiving unit 7 comprises a bi-directional buffer 10, a latch 12, a bus control circuit 11, an address decoder 13, an address register 15, a comparator 16, and an OR circuit 14.

Here, it is to be noted that video data supplied from the video decoder 1 generally consists of a set of a data part and an address part. The data part includes a plurality of video data which substantially represent a dynamic image. On the other hand, the address part includes an address which corresponds to the plurality of video data and which specifies a storage location of the video data or an address of a specific device to which the video data are to be sent. In this connection, the address may be, for example, a port address of the modem. Hereinafter, video data included in the data part will be simply called "data", and the address included in the address part will be simply called "address". On the other hand, video data supplied from the video decoder 1 will be collectively called "video data".

The bi-directional buffer 10 stores data from the PCI bus 2 under control of a bus control circuit 11. The latch 12 latches an address included in the video data from the PCI bus 2 and sends the address to the memory control circuit 9, the address decoder 13, and the comparator 16. The bus control circuit 11 determines whether or not the video data currently obtained from the PCI bus 2 include the address part or the data part assigned to the system memory 4. The bus control circuit 11 controls the latch 12 and the bi-directional buffer 10 as a result of judgement.

The address decoder 13 decodes the address supplied from the latch 12 to determine whether or not the address is assigned to the graphic accelerator 6. The address register 15 stores a predetermined address which defines an address range of the data which are to be simultaneously received by the graphic accelerator 6. From this fact, it is readily understood that the comparator 16 determines whether or not the address from the latch 12 falls within the range determined by the register 15.

The OR circuit 14 responds a signal from the address decoder 13 and a signal from the comparator 16 and performs OR operation of these signals to produce an enable signal for enabling the memory control circuit 9 to access to the data in the bi-directional buffer 10. As a result, the memory control circuit 9 can access the data in the bi-directional buffer 10, only both when the data are to be originally treated by the graphic accelerator 6 and when the data are intended to be simultaneously received by the graphic accelerator 6.

Next, the memory control circuit 9 sends the data to a display control circuit 17 while the frame buffer 8 is being used. The display control circuit 17, when receives the data, converts the data into a converted data signal which can be displayed by a display device (for example, the CRT display 5). The converted data signal is sent from the display control circuit 17 to the CRT display 5 in the illustrated example.

Next, it is assumed in FIG. 1 and FIG. 2 that the video data are transmitted by using the simultaneous receiving unit 7 from the video decoder 1 which functions as a data sending device to the system memory 4 and the graphic accelerator 6 which function as a data receiving device.

Before transmission of the video data, the ranges of address of the system memory 4 into which the video data are to be stored is stored in the address register 15 in the simultaneous receiving unit 7. Next, the video decoder 1 transmits the video data, and the video data stored in an address, specified in the video data, of the system memory 4. At this point, the simultaneous receiving unit 7 in the graphic accelerator 6 also receives the video data simultaneously via the bus 2, and the comparator 16 determines whether or not the address specified in the video data is in the ranges of address stored in the address register 15.

When the address specified in the video data is in the ranges of address stored in the address register 15 (in other words, when the video data are required to the graphic accelerator 6), the video data are fetched into the simultaneous receiving unit 7 in the graphic accelerator 6. As stated above, simultaneous reception is achieved by the simultaneous receiving unit 7.

Figure 3:
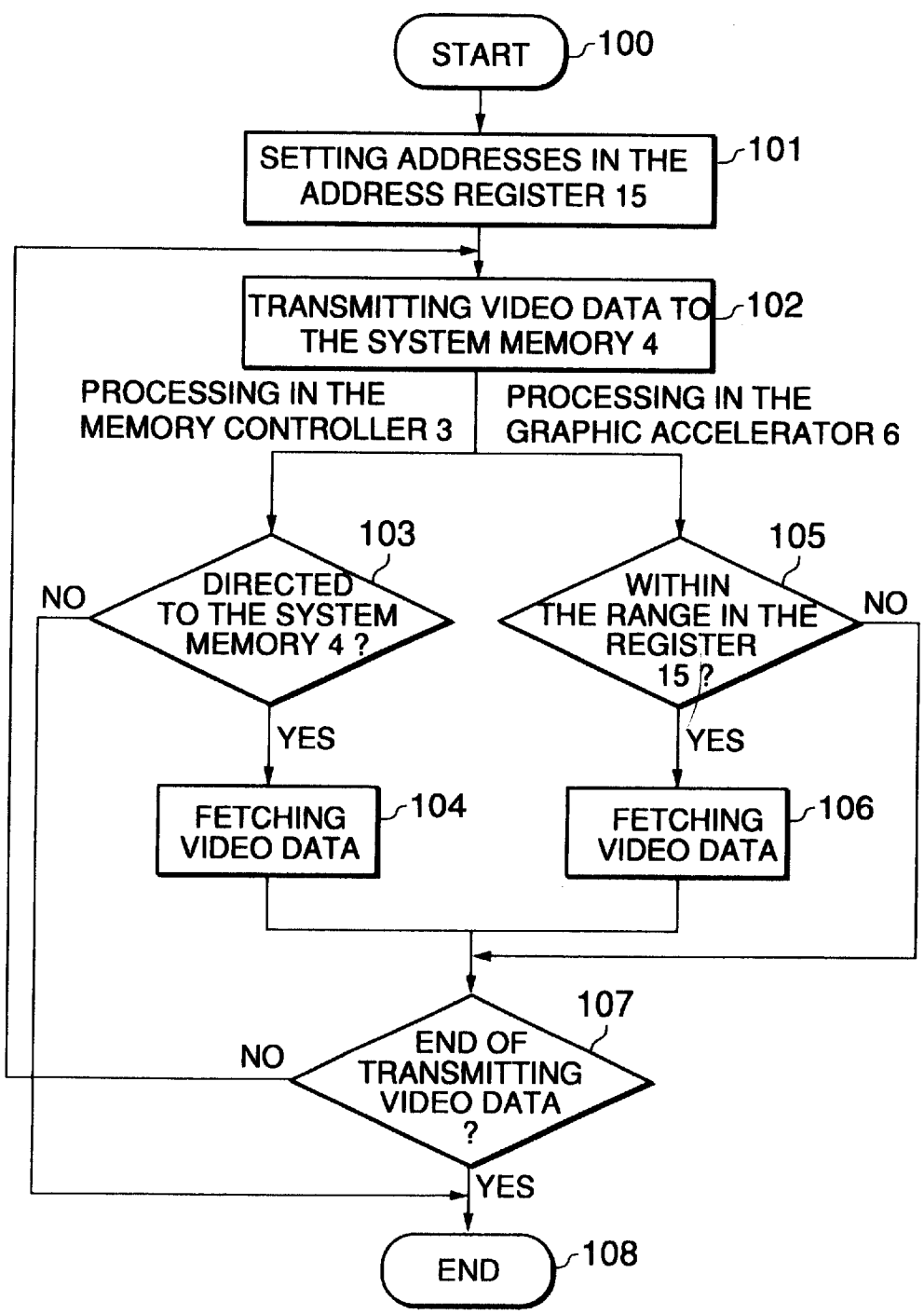
FIG. 3 shows a flow chart representing operations of the data receiving device shown in FIG. 1.

Next, referring to FIG. 3, more detail description will be made about operations of the first embodiment of the invention.

At first, in a step 100, a user of the system instructs to transmit video data with video playing application software. The video data will be transmitted to the system memory 4. Here, the video data may be also received simultaneously with the graphic accelerator 6.

In a step 101, a CPU sets into the address register 15 the predetermined address which determines the range of the system memory 4.

In a step 102, the video decoder 1 starts to transmit the video data. Next, the memory controller 3 and the graphic accelerator 6 start to perform operations in steps 103 and 105, respectively.

In the step 103, the memory controller 3 determines whether or not the received video data is transmitted to the system memory 4. If not, the memory controller 3 does not fetch the video data and ends its process (step 108). If the video data is transmitted to the system memory 4 (step 104), the video data are fetched by the memory controller 3.

On the other hand, in the graphic accelerator 6, the comparator 16 determines whether or not an address from the latch 12 is in the ranges of address stored in the address register 15 in step 105. If the address from the latch 12 is in the address range (step 106), the video data are taken into the graphic accelerator 6. Here, the video data are thus fetched in the steps 104 and 106 simultaneously.

If not in step 105, the video data are not fetched, the process directly proceeds to a step 107. In the step 107, existence of instruction for terminating the simultaneous receiving process is checked. It is judged whether or not the simultaneous receiving process is to be terminated or ended. If the process is to be terminated, the step 108 follows the step 107 to end the process. Otherwise, the step 107 is succeeded by the step 102 to repeat the process again. From the above, the latch 12, the address decoder 13, the comparator 16, and the OR circuit 14 are collectively operable to determine an address and will be collectively referred to as an address determining unit.

In the above-mentioned description, it has been assumed that the circuit according to the first embodiment of the invention has the two receiving devices (the system memory 4 and the graphic accelerator 6). However, the invention is also applicable to an information processing system having three or more receiving devices.

Figure 4:
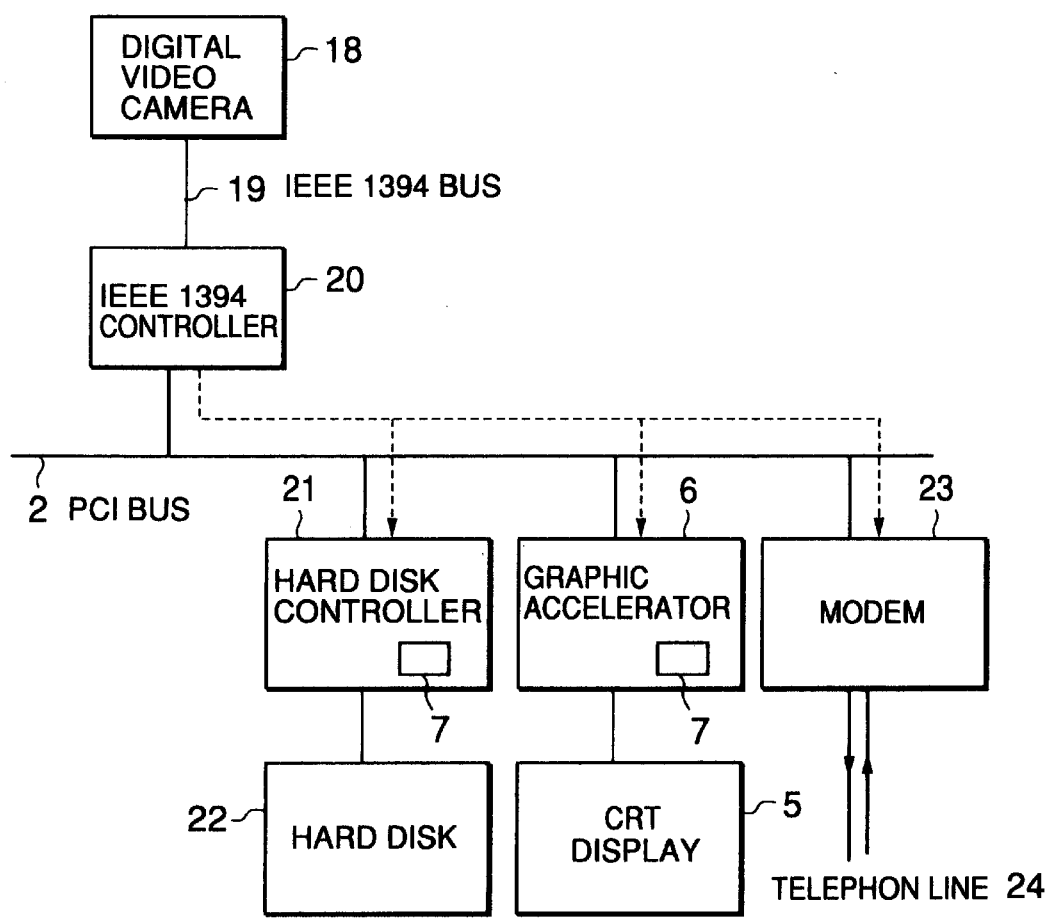
FIG. 4 shows a block diagram of a data receiving device according to a second embodiment of the invention.

Referring to FIG. 4, an information processing system includes a data receiving device according to a second embodiment of the invention. This information processing system is operable to transmit video data to three receiving devices, such as a visual telephone system, in addition to a hard disk 22 and the CRT display 5.

In this information system, each of a hard disk controller 21 and a graphic accelerator 6 includes a simultaneous receiving unit 7 which is similar in structure to that illustrated with reference to FIG. 2. As shown in FIG. 4, the hard disk 22 is connected to the PCI bus 2 via the hard disk controller 21 while the CRT display 5 is connected to the PCI bus 2 via the graphic accelerator 6.

In the illustrated example, a video data stream which is produced by a digital video camera 18 is transmitted via an IEEE1394 bus 19 to IEEE1394 controller 20 which functions as sending devices. Next, IEEE1394 controller 20 transmits the video data onto the PCI bus 2. The video data are received by the modem 23 but are also received by both the hard disk controller 21 and the graphic accelerator 6.

It is noted that the modem 23 has a fixed port address determined in the system, while the addresses in the video data streams as described with respect to FIG. 2 are different from one another and may probably be consecutive for every video data stream.

Let the hard disk controller 21 and the graphic accelerator 6 determine that each video data stream has the fixed port address assigned to the modem 23. In this event, each of the hard disk controller 21 and the graphic accelerator 6 fetches the video data stream. Next, the hard disk controller 21 sends the video data stream in question to the hard disk 22, and the video data stream is successively stored in the hard disk 22 in consecutive addresses in order. On the other hand, the graphic accelerator 6 sends the video data stream to the CRT display 5, and the video data stream is displayed on the CRT display 5 in the reception order.

The illustrated modem 23 is connected to a network, such as a public telephone network, through a public telephone line 24.

As described above, according to the invention, a system can perform simultaneous or parallel receiving function, even if the system does not simultaneous receiving function in original configuration. This is because that there is no need of providing with a specific unit for sending, transmitting, and receiving data, except for adding a simultaneous receiving function to the existing data receiving unit.

What is claimed is:

1. A system for use in performing data communication between devices via a bus, comprising:

a data sending device which sends first data to the bus in one-to-one data communication;

a first data receiving device which receives the first data from the data sending device via the bus; and at least one second data receiving device which receives the first data sent from the data sending device to the first data receiving device, simultaneously with the first receiving device; and, wherein the second data receiving device is configured to receive the first data sent from the data sending device to the first data receiving device via the bus and comprises simultaneous receiving means to an existing second data receiving device which does not have a function to receive the first data in original and, wherein the first data includes an address, the simultaneously receiving means receiving the first data sent from the data sending device to the first data receiving device by determining whether the address meets a predetermined condition, and wherein the first data includes the address and the second data, the simultaneously receiving means comprising:

a bi-directional buffer which temporarily stores the second data from the bus;

a latch which latches the address from the bus, and sends the address to the memory control circuit;

a bus control circuit which determines whether the first data currently received from the bus is the address or the second data, and according to the determination, controls the latch and the bi-directional buffer;

an address decoder which determines whether or not the address from the latch is an address for the second receiving data;

an address register which stores addresses which define ranges of addresses for the first receiving device;

a comparator which determines whether or not the address from the latch is in the range of addresses stored in the address register; and an OR circuit which inputs a signal from the address decoder and a signal from the comparator and according to the signals, controls output of an enable signal for enabling the memory control circuit to access to the second data temporarily stored in the buffer.

2. A method of performing data communication between devices via a bus comprising the steps of:

sending, in a data sending device, first data via the bus in one-to-one data communication;

receiving, in a first data receiving device, the first data which the data sending device sends to the first data receiving device via the bus; and receiving, in at least one second data receiving device, the first data sent from the data sending device to the first data receiving device via the bus, simultaneously with the receiving by the first receiving device; and wherein the first data includes an address and second data, the step of receiving in at least one second data receiving device further comprising the steps of:

registering addresses which defines a predetermined condition; determining whether the first data currently received from the bus is the address or the second data;

determining whether or not the address from the bus is an address for the second receiving device;

determining whether or not the address is in the registered ranges of addresses, if the data is the address;

temporarily storing the second, if the first data is the second data;

enabling the second data receiving device to handle the temporarily stored second data; corresponding to the address, if the address is in the ranges of addresses or the address is the address the second receiving device.

* * * * *